Figure 1:
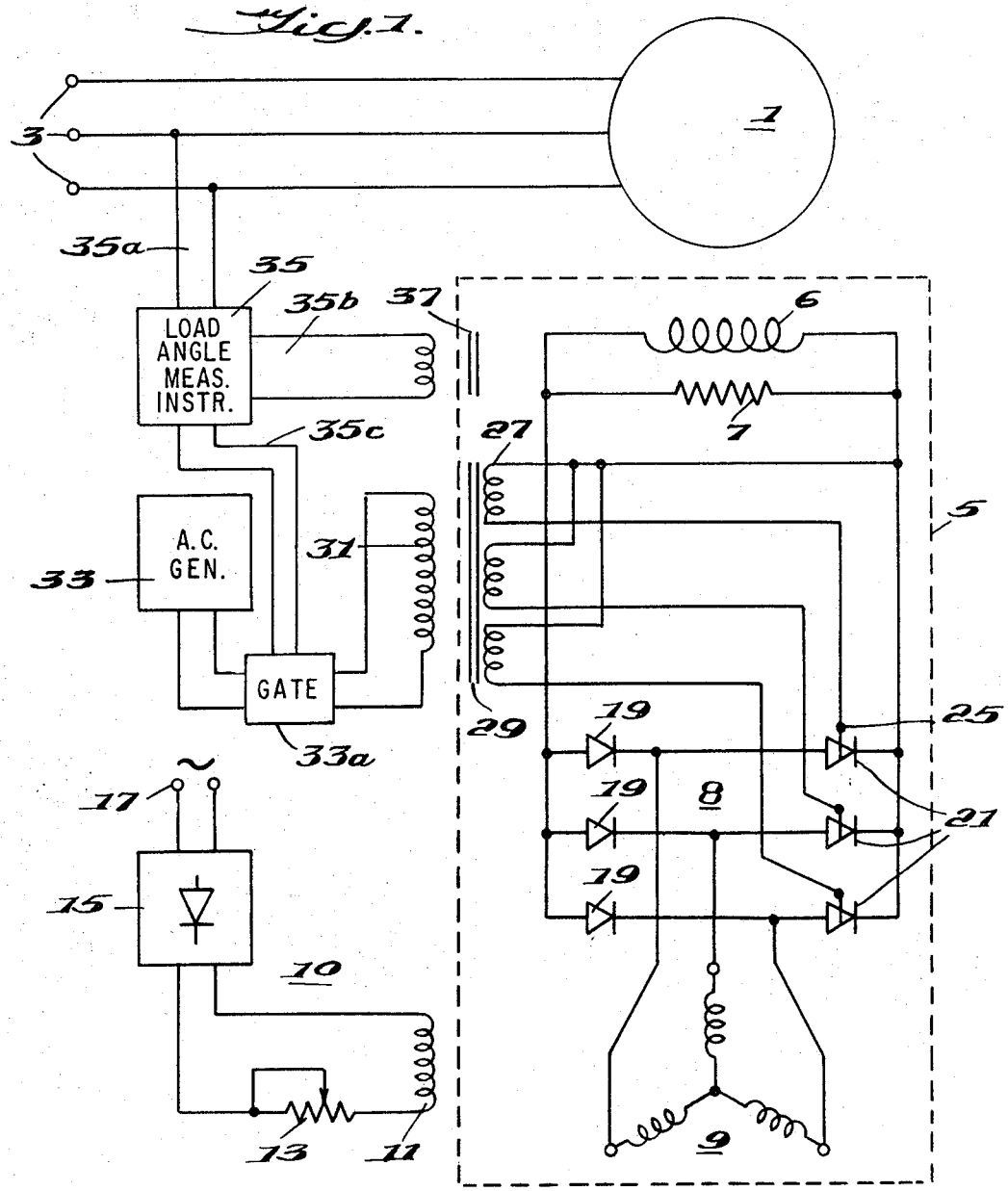

United States Patent
Merhof et al.

[15] 3,667,014
[45] May 30, 1972

[54] EXCITER ARRANGEMENT FOR SYNCHRONOUS MOTORS

[72] Inventors: Wilfried Merhof, Baden; Renato Noser, Ennetbaden, both of Switzerland

[73] Assignee: Aktiengesellschaft Brown, Boveri & Cie, Baden, Switzerland

[22] Filed: Nov. 17, 1970

[21] Appl. No.: 90,431

Related U.S. Application Data

[63] Continuation of Ser. No. 723,144, Apr. 22, 1968, abandoned.

[30] Foreign Application Priority Data

May 26, 1967 Switzerland............................7471/67

[52] U.S. Cl..............................318/167, 318/176, 318/183, 318/193
[51] Int. Cl. .........................................................H02p 1/46
[58] Field of Search..................318/167, 174, 176, 181, 183, 318/193

[56] References Cited
UNITED STATES PATENTS

| | | | |
|---|---|---|---|
| 3,098,959 | 7/1963 | Rosenberry, Jr........................318/181 |
| 3,354,368 | 11/1967 | Williamson........................318/193 X |
| 3,383,575 | 5/1968 | Bobo....................................318/193 X |
| 3,463,987 | 8/1969 | Schlicher et al. ...................318/193 X |
| 3,582,735 | 6/1971 | Maruschak............................318/167 |
| 3,582,736 | 6/1971 | Geib, Jr. ................................318/167 |

*Primary Examiner*—Gene Z. Rubinson
*Attorney*—Pierce, Scheffler & Parker

[57] ABSTRACT

An arrangement for controlling excitation of the field coil on the rotor of a synchronous motor during starting as well as during running at synchronous speed includes a rectifier bridge mounted on the rotor having controllable rectifiers in one bridge half and uncontrollable rectifiers in the other bridge half. The rectifier bridge is supplied with current from an exciter alternator also integrated into the rotor structure. During starting and up to near synchronous speeds the controllable rectifiers are blocked so as to block current flow from the motor field coil through the bridge. Thereafter, these rectifiers become unblocked and feed continuous current to the field coil.

3 Claims, 2 Drawing Figures

INVENTORS
Wilfried Merhof
Renato Noser

BY Pierce, Scheffler & Parker
ATTORNEYS

EXCITER ARRANGEMENT FOR SYNCHRONOUS MOTORS

This application is a continuation of Ser. No. 723,144, filed Apr. 22, 1968 and now abandoned.

This invention relates to an asynchronously starting synchronous motor without slip-rings and having a shaft supporting a field coil for the motor and also the rotor of an exciter alternator which is connected through a rectifier bridge circuit on the rotor to the field coil.

In synchronous motors excited without slip-rings, a voltage of slip-frequency is induced in the field coil during the asynchronous starting phase. However, a corresponding slip-frequency current can flow in one direction only in the circuit of the field coil, since the flow of current is blocked in the other direction by the polarity of the rectifier bridge circuit to which the field coil is connected. Consequently, the induced voltage half-waves occurring during half cycles of non-conduction of the bridge can cause inadmissibly high voltages, which endanger the field coil insulation and also the rectifiers of the bridge circuit.

A known remedial measure is to shunt a parallel resistance across the field coil to limit the voltage induced during asynchronous operation. Since the resistance is substantially short-circuited by the rectifiers of the bridge circuit during the half cycles of bridge conduction, while remaining fully effective for the other half cycle, there flows through the field coil an asymmetrical excitation current having a direct current component. This exciter current disturbs the start of the synchronous motor to a considerable extent and sometimes prevents it completely.

It has been proposed to improve the start of the motor by cutting off, during the asynchronous starting period, the rectifier bridge which supplies the exciter current to the field coil during synchronous operation. This is effected by mechanical switches mounted on the rotor shaft and which also shunt the field coil simultaneously by a parallel resistance to avoid the high induced voltages if the field coil is open circuit during starting. Although such rotating mechanical switches can be constructed, they are complicated and technically unsatisfactory.

It is also known practice for the starting of the synchronous motor to short-circuit the field winding and/or the rectifier arrangement supplying the exciter current in synchronous operation with electronic means, in particular, with controlled current rectifier valves for whose control Zener diodes are provided, for example, in that these current rectifier valves are ignited during the blocking phase of the rectifier arrangement. It is further known how to provide between the rectifier arrangement and the field winding a controlled current rectifier valve, in order to separate the rectifier arrangement from the field winding electrically when the synchronous motor starts. Additional controlled current rectifier valves are then provided in order to short-circuit the field winding simultaneously, or to connect it with a load resistance connected in parallel.

The known arrangements with electronic means for separating, loading, and short-circuiting the exciter current rectifiers and the field winding have the disadvantage that besides the rectifier bridge with uncontrolled rectifiers, rated for the full power, additional controlled valves such as thyristors must be installed for about the same power or even a 1.5 times greater power, and that in particular for the known arrangement mentioned, in the second place, costly circuit measures must be taken for the control of the valves, which, in the present case of rotating circuit elements, reduce the safety of operation.

It is the purpose of the present invention to avoid the mentioned disadvantages and to provide an arrangement which renders possible the starting of a synchronous motor excited without slip rings through a resistance connected in parallel with the field winding, at little expense and with small losses.

According to the invention, the arrangement is characterized in that the rectifier valves of the one bridge half of the bridge circuit are designed uncontrolled and those of the other bridge half controlled, and that a control device is provided for blocking the controlled rectifier valves in asynchronous operation while constantly igniting them in synchronous operation for the production of a flow of current in their conducting direction.

Figure 2:
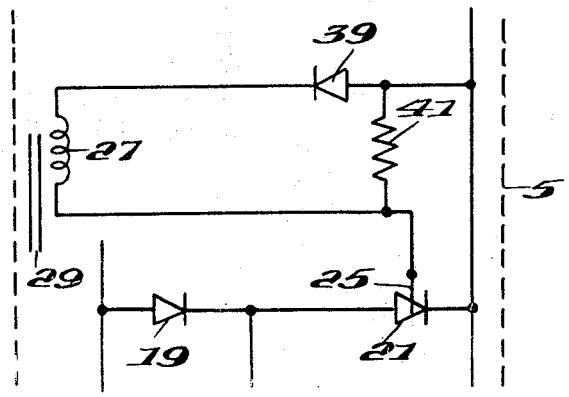

The invention will now be described in more detail, by way of example, with reference to the accompanying diagrammatic drawings, in which:

FIG. 1 illustrates an arrangement using uncontrolled and controlled rectifier valves; and FIG. 2 is a circuit variant for energizing the controlled valves of FIG. 1.

As shown in FIG. 1, a synchronous motor 1 has its stator connected to terminals 3 of a three-phase alternating current supply. Those parts of the circuit which rotate with the rotor of the synchronous motor are enclosed within a frame 5 shown in broken lines. These rotating parts comprise a field coil 6 of the synchronous motor shunted by a resistance 7, a rectifier bridge circuit 8 for feeding unidirectional current to the field coil 6, and star-connected three-phase windings of an exciter alternator 9 for feeding the rectifier bridge circuit 8 with alternating current. A stationary field circuit 10 of the exciter alternator includes a stationary field coil 11 fed through a variable resistance 13 with rectified current provided from a rectifier arrangement 15 energized by terminals 17 of a mono- or poly-phase alternating current supply.

The rectifier bridge circuit 8 has for each limb of the armature winding of alternator 9 a rectifier valve 19 for one conducting direction and a rectifier valve 21 for the other conducting direction. The rectifier valves 19 of one half of the bridge circuit are uncontrolled, whereas the rectifier valves 21 of the other half are constructed as controllable valves, e.g., as thyristors, having control electrodes 25.

The control electrodes 25 are connected at one end to respective ends of rotating star-connected secondary coils 27 of an inductive rotary transformer 29. The other ends of the coils, are connected in common with all of the cathodes of the controlled valves 21, so that the cophasal A.C. voltages of the secondary coils 27 are applied between the control electrodes and cathodes of the controlled valves 21. The transformer has a stationary primary coil 31 connected across the output terminals of a conventional alternating current generator 33 through a gate circuit 33a which supplies an A.C. voltage from generator 33, whose frequency is substantially higher than the frequency of the voltage of the A.C. exciter alternator 9, e.g., 15–20 times higher.

The gate circuit 33a at the output side of the A.C. generator 33 is controlled by a load angle measuring instrument 35 which has not been structurally detailed since it is well known in the art, and one suitable construction which can be adapted to the present invention is disclosed in U.S. Pat. No. Re. 25,893 granted Nov. 2, 1965. This instrument is often used to monitor the operational state of synchronous machines and provides an output signal whenever certain predetermined operational conditions are no longer maintained. Such operating conditions include the load angle. Instrument 35 receives at one pair of input terminals 35a a mains voltage obtained from two of the terminals 3, and at a second pair of input terminals 35b, a voltage produced by an inductive pulse generator 37 at a frequency proportional to the speed of rotation of the field coil 6. Generator 37 can thus, for example, take the form of a conventional A.C. tachometer generator rotated by the rotor shaft of the motor 1 and which produces an A.C. voltage whose frequency varies with the speed of the rotor shaft. The instrument 35 compares the position of the mains voltage vector with the position of the load vector derived from the output of generator 37, and is so designed that when a predetermined minimal slip between the vectors is reached, the instrument 35 produces a synchronizing signal at its output 35c which operates the gate circuit 33a so that the higher frequency A.C. output voltage from generator 33 now feeds the primary coil 31 of transformer 29.

The above-described circuit operates in the following manner:

During starting of the synchronous motor 1, the large slip (load angle) measured by instrument 35 results in blocking of the output of the generator 33. The secondary coils 27 of transformer 29 therefore generate zero volts and the controllable valves 21 are not energized as their cathodes and control electrodes 25 are at the same potential. The resistance 7 shunting the field coil 6 therefore carries the slip-frequency currents induced in the field coil in both positive and negative direction. Thus, the synchronous motor is started without excitation voltage applied to its rotor.

As soon as a predetermined minimum slip is reached caused by the motor approaching synchronous speed during the starting phase, the measuring instrument 35, as already stated, produces a synchronizing signal, which unblocks the alternating current generator 33, so that an alternating voltage is generated across the secondary coils 27 of the transformer 29 and is applied to the control electrodes 25 of the controlled rectifier valves 21. The secondary voltage is of a substantially higher frequency than the frequency of the alternating voltage applied between the valves 19 and 21 by the three windings of the alternator 9 which latter voltage is naturally a function of the rotational speed of the motor. The controlled valves 21 thereafter behave as the uncontrolled valves 19 as a result of the high frequency signals on their control electrodes so that they commutate the alternating voltage applied to them by the windings of the alternator 9. The energization of the controlled valves 21 initiates the synchronization, and the synchronous operation is maintained thereafter by the control electrodes 25 of the controlled valves 21. The voltage regulation is effected as previously on the field coil 11 of the exciter alternator 9.

Should the synchronous motor fall out of synchronism with the supply, the measuring instrument 35 blocks the alternating current generator 33, so that the rotor field 6 excitation is instantaneously interrupted by the fall in potential of the control electrodes 25 of the controlled valves 21 to the cathode potential. This will be the case when the load angle either becomes greater than 180° or when a predetermined slip appears, which, as a rule, will be selected so as to be smaller than the slip at which the starting synchronization is initiated in the aforedescribed manner.

Instead of firing the controlled valves 21 with a high-frequency alternating voltage, applied to the control 25, it is also possible to apply a unidirectional voltage to those electrodes. FIG. 2 illustrates such a circuit variant. The voltage appearing on each secondary coil 27 of transformer 29, is rectified by a rectifier valve 39, and a resistance 41 accommodated on the rotating part 5 provides across it a voltage which is tapped off and applied to the control electrode 25 of the controlled rectifier valve 21.

The resistance 7 shunting the field coil 6 causes small continuous losses during operation which are, however, small as the ohmic value of resistance 7 is about five to 10 times greater than that of the field coil 6. If these losses are not considered acceptable then the resistance 7 may have associated with it a rectifying circuit for cutting the losses at times when the resistor is not required, i.e., during synchronous operation. For example, a control valve with oppositely oriented conducting directions (not shown) can be connected in series with the resistance 7, and can be arranged to be fired by an ignition circuit which includes a Zener-diode. The ignition circuit is so connected, that a firing voltage on the control electrode of the valve is produced only at a slip-frequency voltage induced in field coil 6, and not by the unidirectional exciter voltage applied to the field coil 6. The current path leading through the resistance 7 will then be open circuited at times that a slip-frequency voltage is induced in field coil 6 but will be effectively blocked to the exciter unidirectional voltage during normal synchronous operation of the motor.

It will now be appreciated that the circuits described have the advantage that the output of the bridge rectifiers is composed of half of the output of the uncontrolled valves and half of the controlled valves, but that apart from the bridge valves no additional controlled valves are required. Thus, the additional expenditure incurred as compared with a completely uncontrolled bridge rectifier circuit, is limited to the replacement in the rectifier bridge circuit of half of the uncontrolled valves by controlled valves. In known arrangements for achieving the same result as this invention, in addition to all the uncontrolled valves of the rectifier bridge circuit there must also be provided controlled valves corresponding to at least half of the bridge output.

We claim:

1. A synchronous machine of the alternating current exciter type comprising a stator having a polyphase winding thereon for connection to a polyphase power supply source, a rotor, said rotor including thereon a field winding, a resistor connected in parallel with said field winding, and a polyphase rectifier bridge of the semiconductor type having the direct current output thereof connected to said field winding, the semiconductors in one half of said bridge being constituted by diodes and the semiconductors in the other half of said bridge being constituted by thyristors, an exciter alternator comprising a stationary field coil and a polyphase exciter winding on said rotor connected to the input of said rectifier bridge, said thyristors being blocked during asynchronous speeds of said machine such as during starting to prevent flow of any output current from said bridge to said field winding, and means to unblock said thyristors including an alternating current generator producing a voltage having a frequency substantially higher than the frequency of the voltage generated by said exciter alternator, a transformer, a gate connected between the output of said higher frequency generator and the primary of said transformer, said transformer including a secondary on said rotor and which is connected to the control electrodes of all of said thyristors, and means responsive upon attainment of near synchronous speed to actuate said gate and thereby connect the output of said higher frequency generator to said transformer and application of the output from the secondary thereof continuously to said control electrodes of said thyristors to effect a corresponding continuous unblocking thereof and hence an unblocking of said bridge thereby to establish a flow of direct current to said field winding powered by the output from said exciter alternator.

2. A synchronous machine of the alternating current exciter type as defined in claim 1 wherein the voltage produced by said generator has a frequency from 15 to 20 times higher than that of the voltage produced by said exciter alternator.

3. A synchronous machine of the alternating current exciter type as defined in claim 1 wherein rectifier means are included in the circuit connections between the secondary of said transformer and the control electrodes of said thyristors.

* * * * *